United States Patent

Ng et al.

[11] Patent Number: 5,829,882
[45] Date of Patent: Nov. 3, 1998

[54] LINEAR MOTION BEARING ASSEMBLY

[76] Inventors: Alison Ng, 445 E. 14th St., Apartment 3F, New York, N.Y. 10009; Danut M. Iliescu, 189-16 Station Rd., Flushing, N.Y. 11358

[21] Appl. No.: 884,196
[22] Filed: Jun. 30, 1997

Related U.S. Application Data

[60] Provisional application No. 60/030,554 Nov. 14, 1996.
[51] Int. Cl. [6] .................................................. F16C 29/06
[52] U.S. Cl. ............................................................... 384/43
[58] Field of Search ................................. 384/43, 44, 45, 384/49

[56] References Cited

U.S. PATENT DOCUMENTS

| | | | |
|---|---|---|---|
| 3,545,826 | 12/1970 | Magee et al. | 384/43 |
| 3,767,276 | 10/1973 | Henn | 384/43 |
| 3,832,020 | 8/1974 | McCloskey | 384/43 |
| 3,951,472 | 4/1976 | Schurger et al. | 384/43 |
| 5,046,862 | 9/1991 | Ng | 384/43 |
| 5,582,487 | 12/1996 | Teramachi | 384/45 |

*Primary Examiner*—Thomas R. Hannon
*Attorney, Agent, or Firm*—Dilworth & Barrese

[57] ABSTRACT

A linear motion bearing assembly is provided and includes rolling element retainer structure, outer housing sleeves, a plurality of load bearing plates and plate retainer structure. The retainer structure of the bearing assembly can be either monolithically formed or, alternatively, assembled from multiple elements. At least a portion of axial tracks are formed in the outer radial faces of the retainer structure with each track having a load bearing portion providing access to a support shaft, rail or spline. An outer housing including a pair of sleeves are provided to encompass and protect the retainer structure and the rolling elements contained therein. One or more of these components is preferably formed of an engineering plastic or ceramic. A plurality of non-metallic load bearing plates, preferably of the self-aligning type, are positioned within the outer housing and serve to receive and transmit loads from the rolling elements in the load bearing portion of the tracks. Non-metallic plate retainer structure is configured and positioned to directly receive and transmit loads from the load bearing plates to a carriage into which the bearing assembly is mounted. Alternatively, the load bearing plates and the plate retainer structure may be monolithically formed. The plate retainer structure may also be extended longitudinally to substantially enclose the exterior surface of the retainer structure. In this configuration, no separate outer housing structure is needed.

20 Claims, 11 Drawing Sheets

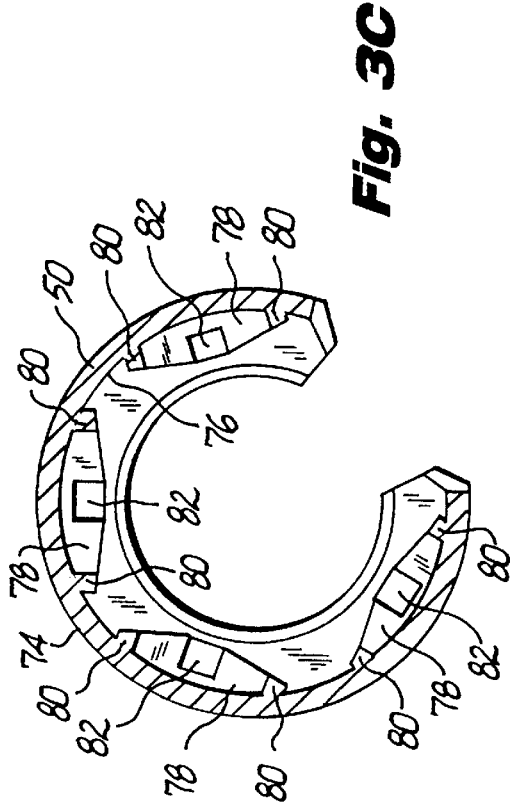

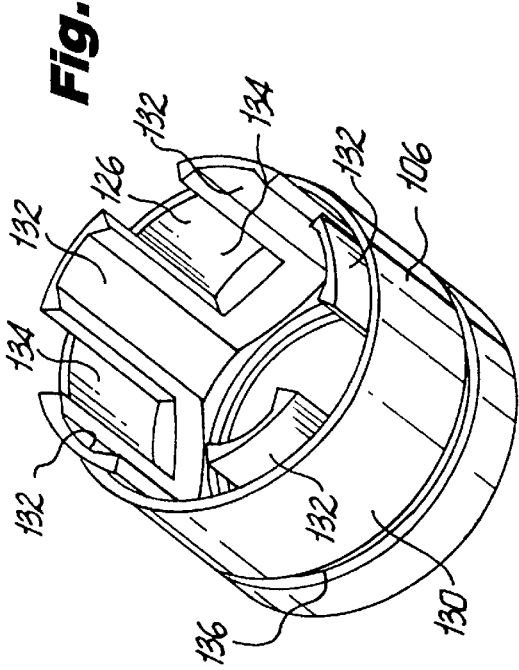
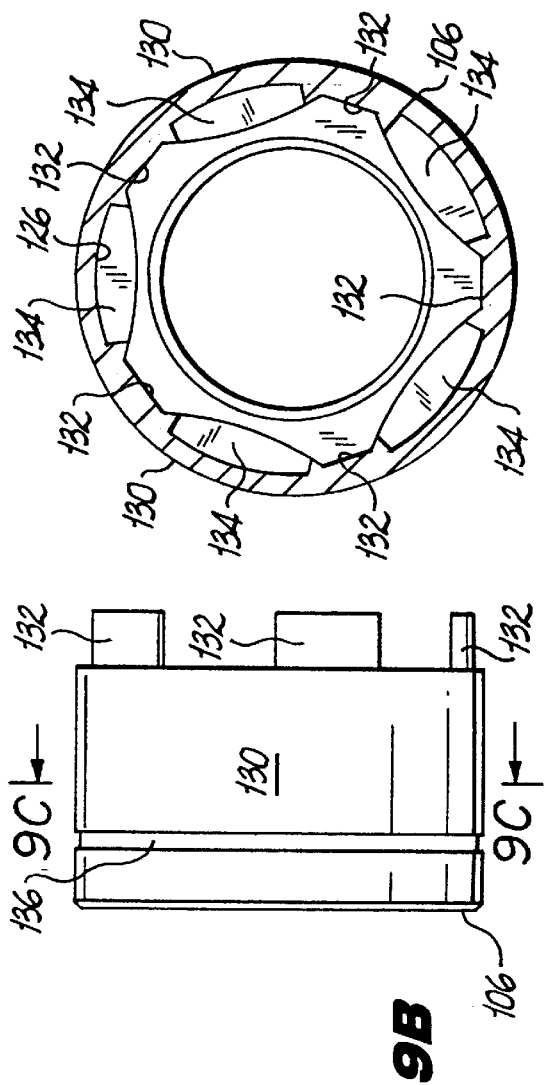
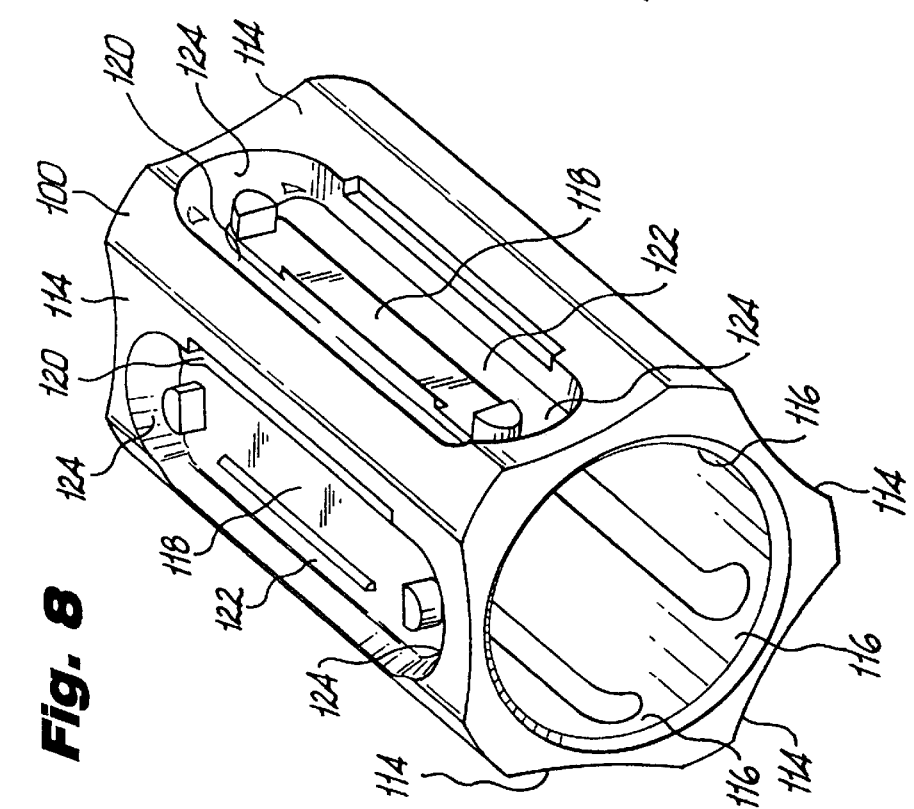

LINEAR MOTION BEARING ASSEMBLY

CROSS REFERENCE TO RELATED APPLICATIONS

This application claims priority from U.S. Provisional application Ser. No. 60/030,554, filed Nov. 14, 1996.

FIELD OF THE INVENTION

The present invention relates to anti-friction linear motion bearing assemblies and, more particularly, to multiple track linear bearing assemblies for longitudinal movement along a shaft or rail.

DESCRIPTION OF THE RELATED ART

The present invention is directed to improvements in linear motion bearing assemblies. In particular, the improvements relate to lighter duty linear motion bearing assemblies of the type which support a carriage or pillow block for linear movement along a support member such as an elongated shaft, rail or spline. In lighter duty applications, quieter operating conditions, vibrational damping, lower cost and non-magnetic considerations may outweigh load bearing ability. Also, in highly corrosive environments, the presence of metallic elements may present shorter limitations on the lifetime of bearing assemblies.

These bearing assemblies can either be of the open type or the closed type. Bearing assemblies contemplated by the present invention generally include an outer housing and a rolling element retainer dimensioned for insertion into the outer housing. The retainer defines a plurality of longitudinal planar faces each having at least one rolling element track in a loop configuration for containing and recirculating steel rolling elements. The tracks include open portions which facilitate load transfer from the supporting shaft to steel load bearing structure such as load bearing plates operatively associated with either the retainer or the outer housing. Return portions of the tracks permit continuous recirculation of the rolling elements through the tracks during linear motion. The retainer is typically formed as a monolithic element with the tracks integrally incorporated therein. See, U.S. Pat. No. 3,767,276 to Henn.

The load bearing structure is typically formed of integral steel elements formed on an inner radial surface of the outer housing. Typical bearing assemblies utilizing load bearing structure formed in the outer housing are shown, for example, in commonly owned U.S. Pat. No. 5,046,862 to Ng, the disclosure of which is incorporated herein by reference.

In lieu of integral load bearing structure, separate steel load bearing plates may be utilized to transfer loads from the supporting shaft. These load bearing plates are longitudinally oriented in association with the retainer so as to engage at least those rolling elements in direct contact with the support shaft. These load bearing plates may also be configured to be axially self-aligning by providing structure which permits the plates to rock into and out of parallelism with the longitudinal axis of the retainer. See, for example, commonly owned U.S. Pat. No. 3,545,826 to Magee et al. Individual load bearing plates may be expanded transversely so as to engage rolling elements in corresponding adjacent load bearing tracks. In this form, parallel grooves are formed in the underside of the plates to guide the rolling elements while they are in the load bearing portion of the tracks. See, for example, U.S. Pat. No. 3,951,472 to Schurger et al.

Typically, the load bearing elements, load bearing plates and/or the outer housings of bearing assemblies are fabricated from a high quality steel such as AISI 52100 or AISI 1060. This fabrication is expensive and requires a very high degree of accuracy. In addition, the overall weight of the bearing is substantially increased by the large relative percentage of steel used. Bearings utilizing these steel components usually require some form of regular lubrication and cannot be utilized in magnetic sensitive or corrosive chemical environments.

In addition, conventional linear motion bearing assemblies utilizing steel load bearing plates and steel rolling elements for movement along a steel shaft, do not typically maximize material load and efficiency. This is because the load transfer between the steel rolling elements and the steel shaft encompasses a much smaller surface area that the surface area of load transfer between the steel rolling elements and the steel load bearing plates. This results in an uneven stress distribution between the steel load bearing plates, the steel rolling elements and the steel shaft. In particular, the steel load bearing elements are typically provided with a much higher load capability than is necessary in intended operation. By adjusting the materials of construction of, inter alia, the load bearing plates, the stress distribution can be much more effectively balanced.

Accordingly, it is one object of the present invention to provide a linear motion bearing assembly which can be inexpensively and efficiently manufactured.

It is another object of the present invention to provide a linear motion bearing assembly which is easily fabricated using engineering plastics.

It is a further object of the present invention to provide a low cost linear motion bearing assembly for use in corrosive and/or magnetic sensitive environments.

It is another object of the present invention to provide a linear motion bearing that has reduced bearing noise over conventional linear motion bearings.

It is a further object of the present invention to provide a linear motion bearing having a substantial mass reduction in comparison to conventional linear motion bearing assemblies.

It is another object of the present invention to provide a simple and efficient fabrication and assembly process for a linear motion bearing assembly.

These and other highly desirable objects are accomplished by the present invention in a linear motion bearing assembly having a plurality of rolling element tracks and bearing plates arranged in a retainer and enclosed by a housing which serves to enclose the rolling elements, tracks and load bearing plates.

Objects and advantages of the invention are set forth in part herein and in part will be obvious therefrom, or may be learned by practice with the invention, which is realized and attained by means of instrumentalities and combinations pointed out in the appended claims. The invention comprises the novel parts, constructions, arrangements, combinations, steps, processes and improvements herein shown and described.

SUMMARY OF THE INVENTION

Accordingly, the present invention provides a linear motion bearing assembly for movement along a shaft. The linear motion bearing with ceramic or polymer rolling elements, retainer and load bearing plates provides a decreased mass, lower cost, quieter operating characteristics not found in conventional linear motion bearings. Furthermore, during fabrication and assembly, greater dimensional inaccuracy tolerances are available. Bearings fabricated in this manner are capable of lubricant-free operation and washdown. They also possess non-magnetic and non-electroconductive characteristics not available in conventional steel linear motion bearings.

The retainer structure of the bearing assembly can be either monolithically formed or, alternatively, assembled from multiple elements. Preferably, the multiple elements are all identical and can be assembled to a variety of configurations for either open-type bearing assemblies or closed-type bearing assemblies. At least a portion of the axial tracks are formed in the retainer structure and, preferably, the complete tracks are formed therein. The linear motion bearing assembly further includes a retainer which substantially encloses the retainer structure. The retainer is preferably formed of an engineering plastic and serves to protect the retainer and rolling elements contained therein from ambient contamination.

A plurality of non-metallic load bearing plates are axially positioned within the retainer and serve to receive and transmit loads from the rolling elements in the load bearing portion of the tracks. The non-metallic load bearing plates are at least partially retained in the linear motion bearing assembly by the retainer. Alternatively, the load bearing plates may be monolithically formed as part of the retainer. The retainer is preferably in the form of a non-metallic plate retainer ring and is configured and positioned to directly receive and transmit loads from the load bearing plates to a carriage into which the linear bearing assembly is mounted.

Preferably, the load bearing plates and/or the plate retainer structure are configured and dimensioned such that the linear motion bearing assembly is substantially self-aligning on the shaft. It is also preferred that the load bearing plates and/or the plate retainer structure be configured to effect both axial and circumferential self-alignment of the linear motion bearing assembly on the shaft.

In preferred embodiments the rolling elements are also formed of a non-metallic material such as, for example, an engineering plastic or ceramic. As used herein rolling elements are intended to encompass a wide variety of structure including, inter alia, balls, rollers, barrels, needles, etc.

End containment elements, such as, for example, snap rings or C-rings are positioned at either longitudinal end of the retainer to enclose and hold the retainer structure therein. These may also be formed of a non-metallic material. Optionally, end seals may be positioned on the longitudinal ends to protect the bearing assembly from ambient contamination.

BRIEF DESCRIPTION OF THE DRAWINGS

The accompanying drawings, referred to herein and constituting a part hereof, illustrate the preferred embodiments of the bearing assembly of the present invention and, together with the description, serve to explain the principles of the invention.

FIG. 2 is a perspective view of a retainer segment in accordance with the linear motion bearing assembly of FIG. 1.

FIG. 3A is a perspective view of the sleeve portion of the outer housing of the linear motion bearing assembly of FIG. 1.

FIG. 3B is a side view of the sleeve portion of FIG. 3A.

FIG. 3C is a cross-sectional view taken along line 3C—3C in FIG. 3B of the sleeve portion of FIG. 3A.

FIG. 8 is a perspective view of a monolithic retainer segment in accordance with the linear motion bearing assembly of FIG. 7.

FIG. 9A is a perspective view of the sleeve portion of the outer housing of the linear motion bearing assembly of FIG. 7.

FIG. 9B is a side view of the sleeve portion of FIG. 9A.

FIG. 9C is a cross-sectional view taken along line 9C—C of FIG. 9B of the sleeve portion of FIG. 9A.

DETAILED DESCRIPTION OF PREFERRED EMBODIMENTS

Figure 1:
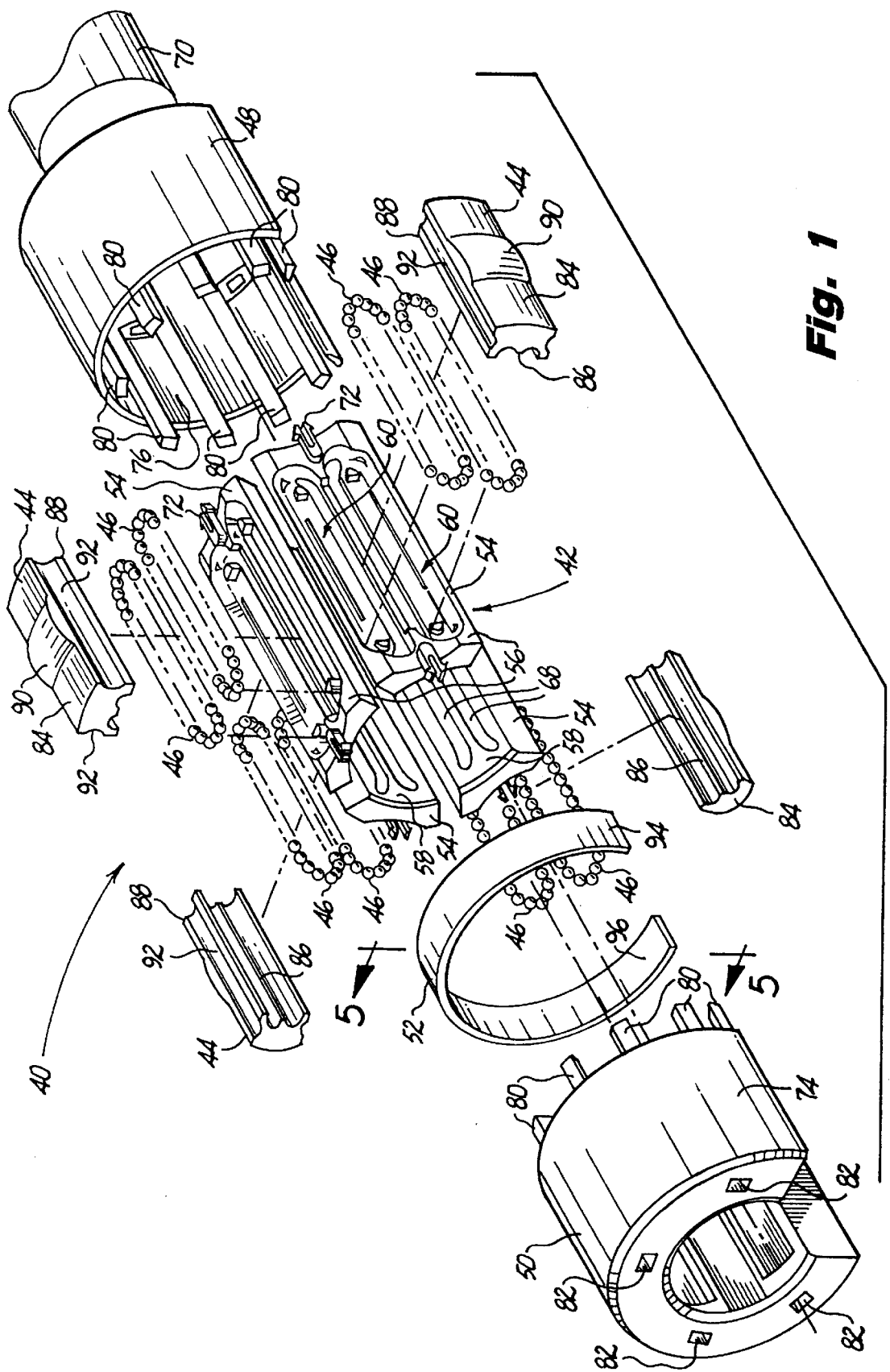
FIG. 1 is an exploded perspective view of a linear motion bearing assembly in accordance with one embodiment of the present invention.

Referring initially to FIGS. 1–6, there is shown a linear motion open-type bearing assembly 40 in accordance with a preferred embodiment of the present invention. The bearing assembly includes retainer structure, shown generally at 42, load bearing plates 44, rolling elements 46, outer housing sleeves 48, 50 and plate retainer structure 52.

In FIGS. 1–2 details of the retainer structure 42 are illustrated. In this embodiment of the present invention the retainer structure 42 is formed of a non-metallic material such as, for example, ceramic or an engineering plastic. Retainer structure comprises four rolling element retainer segments 54, each operatively associated with adjacent retainer segments along longitudinal sides thereof to form a pentagonally shaped retainer structure having a bore therethrough for receiving a shaft 70. Although shown here as a round shaft, grooved shaft or rails are also contemplated. These shafts and/or rails may preferably be formed of a non-metallic material such as, for example, ceramics and/or engineering plastics or composites thereof.

Each retainer segment 54 includes an outer radial surface 56 and an inner radial surface 58. Axial rolling element tracks 60 are formed in the outer radial surface 56 of each retainer segment 54 and include load bearing portions 62, return portions 64 and turnarounds 66. The load bearing and return portions of the tracks in this embodiment are undercut to facilitate loading and retention of the rolling elements 46 therein. This also eliminates the need for separate retainer structure to keep the rolling elements in the tracks. A longitudinal bore 68 in the inner radial surface 58 of the retainer segment 54 extends substantially the length of the load bearing portions 62 and accesses support shaft 70. Although support shaft 70 is illustrated as a substantially cylindrical shaft, one skilled in the art will appreciate that support members of other configurations are within the scope of the invention.

In this embodiment of the linear motion bearing assembly 40, the individual retainer segments 54 are easily molded from an appropriate engineering plastic using known materials and molding techniques. By individually forming each of the retainer segments, the molding process is greatly simplified and thus results in a lower cost to produce.

A plurality of rolling elements, for example bearing balls 46, are disposed in the tracks 60 with those bearing balls 46 in the load bearing tracks 62 extending at least partially into longitudinal bores 68 to contact support shaft 70. In configurations wherein noise, corrosive chemical resistance, or magnetic fields are design issues, it is envisioned that bearing balls can be fabricated from an engineering plastic or from ceramics. In this embodiment of the invention, a pair of tracks 60 are formed in each outer radial surface 56 of the retainer segment with the corresponding load bearing tracks being oriented in substantially parallel adjacent relation. This orientation facilitates enhanced load capacity and maximizes space utilization for a more compact and efficient bearing ball arrangement. Locking structure in the form of locking clips 72 are formed on opposing longitudinal ends of each retainer segment 54 to facilitate assembly with outer housing sleeves 48, 50, discussed in greater detail hereinbelow.

Referring now to FIGS. 1 and 3A–C, the linear motion bearing assembly in accordance with one preferred embodiment includes a pair of outer housing sleeves 48, 50 which, when assembled serve to close and protect the exposed outer radial surfaces 56 of retainer structure 42. Preferably, each of sleeves 48, 50 are identical in configuration and are molded from an engineering plastic to facilitate ease of manufacture and assembly. However, one skilled in the art will appreciate that, when operating conditions or specific applications require, the sleeves may be made in differing configurations and of different materials.

The outer radial surfaces 74 of sleeves 48, 50 are preferably of a smooth cylindrical shape and are configured and dimensioned to fit within a mounting bore of a tool carriage (not shown). The inner radial surface 76 of sleeves 48, 50 include mounting surfaces 78 which are configured to receive at least a portion of load bearing plates 44 therein. These mounting surfaces 78 further include extension portions 80 which define a mounting space for plate retainer structure 52, described in greater detail below. Preferably, mounting surfaces 78 are recessed from outer radial surface 74 by a distance approximating the cross-sectional thickness of plate retainer structure 52. In this manner, the outer housing sleeves 48, 50 and the plate retainer structure 52 combine to form a relatively smooth and uniform outer radial surface of the linear motion bearing assembly 40. See, FIG. 6.

In this embodiment of the present invention, mounting surfaces 78 are configured to fit the shape of individual retainer segments 54. A plurality of locking bores 82 are formed in respective ends of sleeves 48, 50 in alignment with locking clips 72 of retainer segments 54. Thus, when the retainer segments 54 are assembled into the sleeves 48, 50, locking clip 72 extends into respective locking bores 82 and assists in holding linear motion bearing assembly 40 together.

Figure 4:
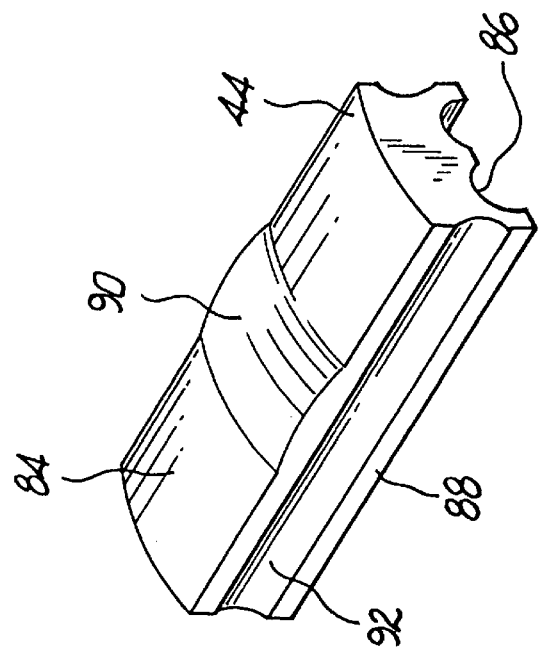
FIG. 4 is a perspective view of the load bearing plate in accordance with the linear motion bearing assembly of FIG. 1.

Referring now to FIGS. 1 and 4, a plurality of individual load bearing plates 44 are incorporated into the linear motion bearing assembly 40 and serve to receive load from the bearing balls 46 in contact with shaft 70. In the embodiment of FIG. 4, load bearing plate 44 is formed of a non-metallic material such as, for example, an engineering plastic or a ceramic. The load bearing plate 44 is elongated along the longitudinal axis of the bearing assembly and includes an outer radial surface 84, an inner radial surface 86, and a pair of side wall surfaces 88. The outer radial surface 84 is substantially arcuate and, in a preferred embodiment, includes a crown portion 90 disposed on the outer radial surface 84 in a medial position. Crown portion 90 is configured and dimensioned to permit the load bearing plates to rock both circumferentially and longitudinally into and out of parallelism with the axes of the retainer 42.

The inner radial surface 86 of the load bearing plate of this embodiment is advantageously provided with a pair of axial grooves which serve as the upper surface of load bearing portions 62 of tracks 60. By providing a single load bearing plate 44 for each pair of load bearing portions 62 in each outer radial surface 56, the linear motion bearing assembly 40 is easier to fabricate and assemble.

In this embodiment of the present invention, a longitudinal groove 92 is formed in each side wall surface 88 of load bearing plates 44. These grooves 92 make up a side wall of the axial tracks 60 and guide bearing balls 46 as they move through the return portion thereof.

Figure 5:
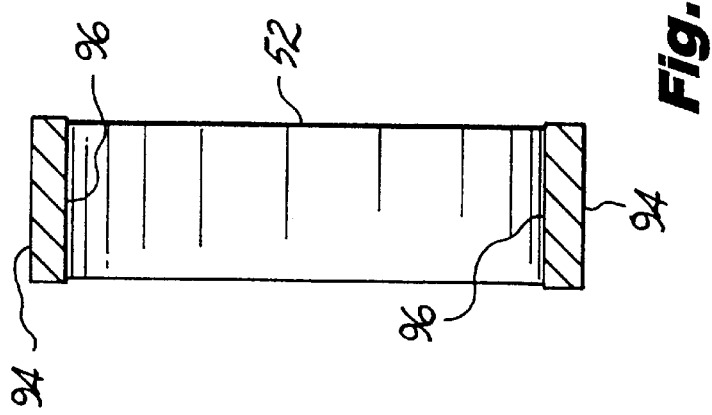
FIG. 5 is a cross-sectional view of the plate retainer ring taken along line 5—5 of FIG. 1.
Figure 6:
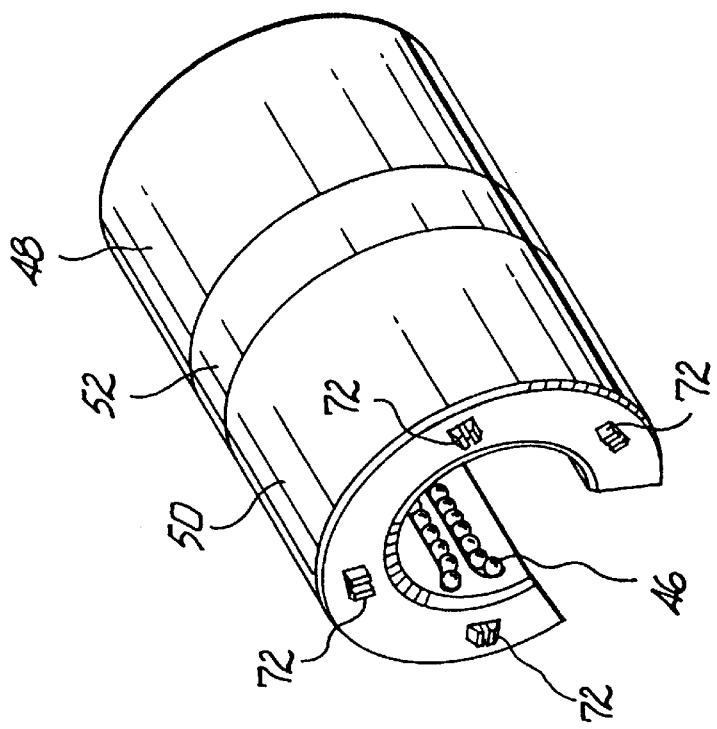
FIG. 6 is a perspective view of the assembled linear motion bearing assembly of FIG. 1.

Referring now to FIGS. 1, 5 and 6, plate retaining structure 52 is illustrated in a C-ring configuration having an outer radial surface 94 conforming substantially in dimension to the outer radial surface 74 of sleeves 48, 50. In this embodiment of the invention, the inner radial surface 96 is substantially parallel to the outer radial surface and is configured and dimensioned, when assembled, to contact crown portion 90 of load bearing plates 44. The radius of curvature of the crown portion 90 in the transverse direction is preferably smaller than the radius of curvature of the inner radial surface of the plate retainer structure 52. This configuration allows the plates to rock circumferentially with respect to the inner surface of the plate retainer structure 52.

Further, referring to FIGS. 1 and 6, the plate retaining structure 52 encompasses and engages extension portions 80 of sleeve 48, 50 to assist in enclosing and protecting retainer structure 42. Although shown in a narrow width, it is contemplated that the plate retaining structure 52 may extend substantially the entire longitudinal length of the bearing assembly, as discussed herein below. The plate retaining structure is preferably formed of an engineering plastic or ceramic material such as, for example, polyamide-imide, polyketone, polyether-imide, poly ethyl ether ketone, nylon, acetal, polycarbonate, silicon carbide, or silicon nitride.

When the inner radial surface 96 is positioned in contact with the crown portion 90 of the load bearing plates 44, this structure acts as the primary conduit for load from the load bearing plates and transmits that load directly to the carriage (not shown) into which the bearing assembly is mounted. This arrangement of elements facilitates ease of manufacture and assembly resulting in an inexpensive, highly efficient, bearing assembly.

It is also envisioned that various seals and/or wiper structure will be incorporated into the bearing assembly to inhibit the ingress of dust, dirt or other contaminants. See, for example, U.S. Pat. No. 3,545,826 to Magee et al., the disclosure of which is incorporated herein by reference.

FIGS. 7–11 illustrate a second preferred embodiment of a linear motion bearing assembly, shown generally at 98, in accordance with the present invention. Although shown as a closed-type bearing assembly, one skilled in the art will readily appreciate that the features of this bearing assembly are equally applicable to open-type bearing assemblies. The linear motion bearing assembly 98 includes a monolithic plate retainer structure 100, load bearing plates 102, rolling elements 104, outer housing sleeves 106, 108 and retainer structure 110.

Figure 7:
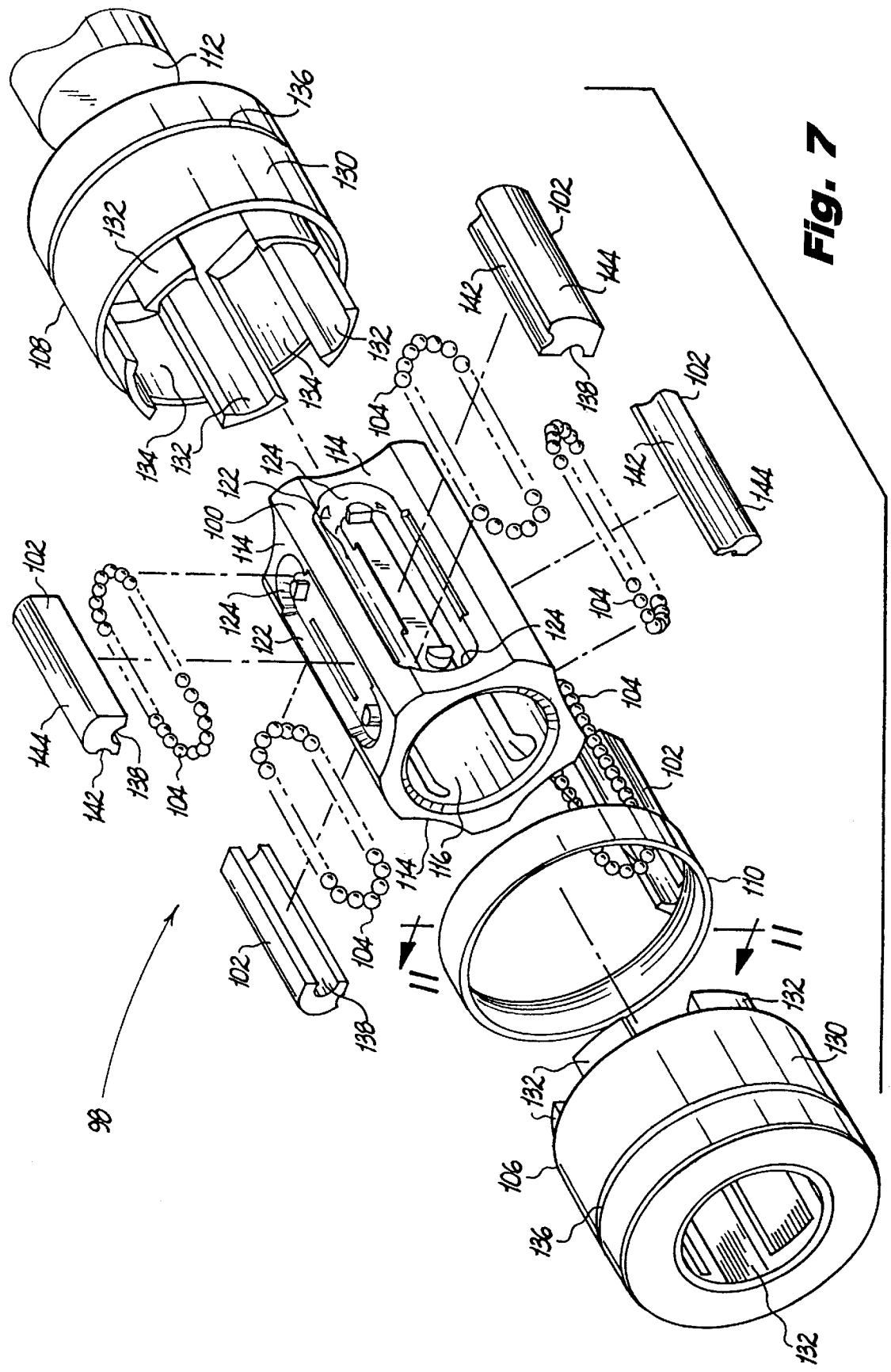
FIG. 7 is an exploded perspective view of a linear motion bearing assembly in accordance with another embodiment of the present invention.

Referring now to FIGS. 7–8, the retainer structure 100 in accordance with the present invention comprises a monolithic structure having a pentagonal cross-section and defining an axial bore therethrough configured and dimensioned to receive shaft 112. The retainer structure 100 includes five planar faces, each having an outer radial surface 114 and an inner radial surface 116. A single axial rolling element track 118 is formed in each of the five faces. Each track 118 includes a load bearing portion 120, a return portion 122 and a pair of turnarounds 124. The outer radial surface 114 is preferably shaped to conform to the inner radial surface 126 of outer housing sleeves 106, 108. A longitudinal channel 128 extends through the inner radial surface 116 of the load bearing portion 120 to permit rolling elements, e.g. bearing balls 104, therein access to shaft 112. Both the load bearing portions 120 and the return portions 122 of the tracks of this embodiment of the present invention are substantially open to facilitate loading of the bearing balls 104 therein.

FIGS. 7 and 9A–C show the outer housing sleeves 106, 108 in accordance with this embodiment of the present invention. As in the previously described embodiment, it is preferable that both sleeves be identical to facilitate manufacture and assembly. Sleeves 106, 108 include an inner radial surface 126 and an outer radial surface 130. Because axial tracks 118 are open, as opposed to undercut, upper track housing structure 132 is formed in the inner radial surface 126 of sleeves 106, 108. This upper track housing structure 132 forms an outer radial portion of the tracks and serves to better guide bearing balls 104 between load bearing and return portions, 120 and 122 respectively. Upper track housing structure 132 preferably extends axially beyond sleeves 106, 102 and is recessed from the outer radial surface 130 thereof to permit emplacement of plate retaining structure 110 discussed in detail below.

In this embodiment, cavities 134 are formed between said upper track housing structures 132 and configured and dimensioned to receive at least an outer radial portion of the load bearing plates 102. As in the previous embodiment, preferably each sleeve 106, 108 is monolithically formed from an engineering plastic to facilitate ease of manufacture and assembly. Where desirable, an annular groove 136 may be formed in the outer radial surface 130 of the sleeves 106, 108 to assist in mounting in carriage structure. Other known methods of mounting the bearing assembly in a carriage structure are also contemplated and include, for example, bolts, clips, pins, etc.

Figure 10:
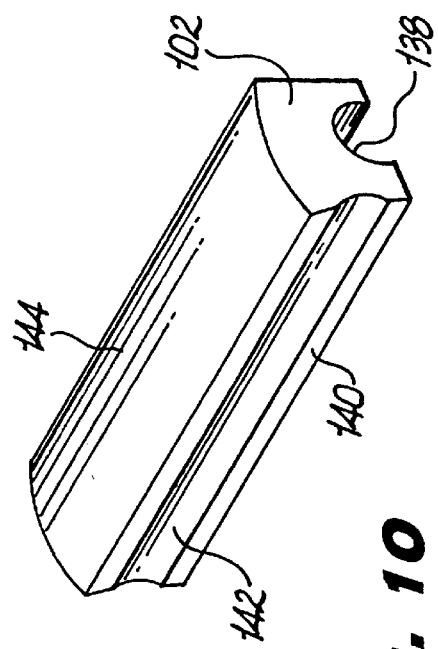
FIG. 10 is a perspective view of the load bearing plate in accordance with the linear motion bearing assembly of FIG. 7.

Referring now to FIGS. 7 and 10, load bearing plates 102 in accordance with this embodiment of the present invention are positionable between retainer 100 and outer housing sleeves 106, 108 in cavities 134. These load bearing plates 102 are similarly formed of an engineering plastic. The load bearing plates 102 include a single longitudinal groove 138 formed on an inner radial surface thereof for contacting and guiding bearing balls 104 in the load bearing portions 120 of tracks 118. A side wall 140 of the load bearing plate 102 also includes a longitudinal groove 142 for guiding the bearing balls 104 in the return portion 122 of the tracks 118. The outer radial surface 144 of the load bearing plate 102 has a substantially smooth arcuate configuration to facilitate both axial and circumferential self alignment as will be described in greater detail hereinbelow.

Figure 11:
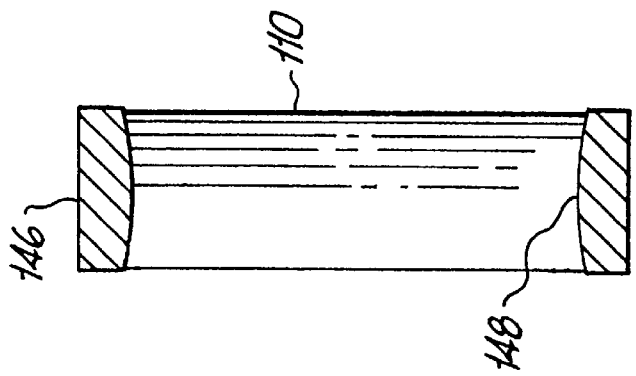
FIG. 11 is a cross-sectional view of the plate retainer ring taken along line 11—11 of FIG. 7.
Figure 12:
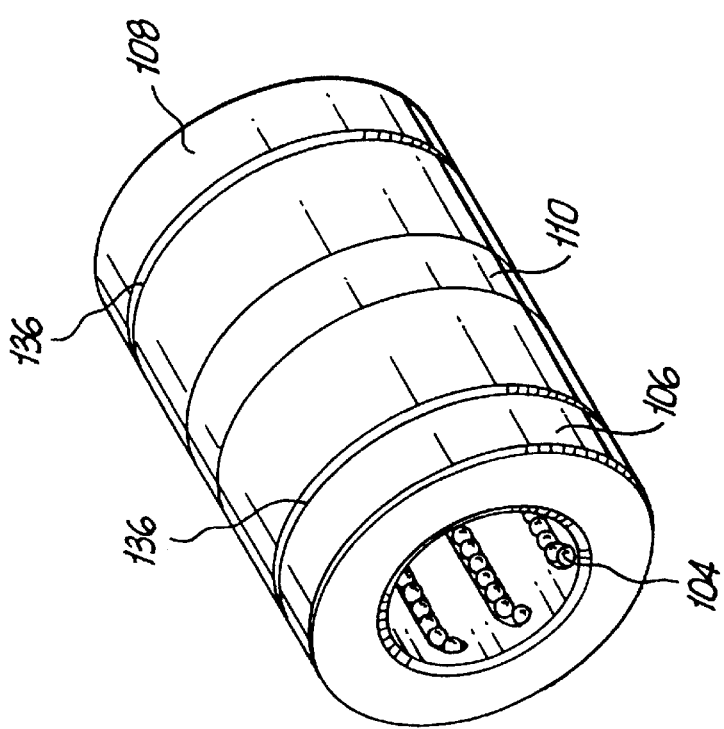
FIG. 12 is a perspective view of the assembled linear motion bearing assembly of FIG. 7.

Plate retaining structure 110 is illustrated in FIGS. 7, 11 and 12, and is shown as a generally closed ring configuration having an outer radial surface 146 conforming substantially in dimension to the outer radial surface 130 of sleeves 106, 108. The inner radial surface 148 is substantially convex when viewed in cross-section (FIG. 11) relative to the outer radial surface 146. This inner radial surface 148 is configured and dimensioned to contact the arcuate outer radial surface 144 of load bearing plates 102 when the linear motion bearing is assembled. The radius of curvature of the arcuate outer radial surface 144 of the load bearing plates 102 is preferably smaller than the radius of curvature of the inner radial surface 148 of the plate retainer structure 110. This configuration results in a contact between the arcuate outer radial surface 144 and the inner radial surface 148. This point-to-point contact permits both circumferential and axial self alignment of the bearing assembly when positioned on the shaft 112. The width of the plate retainer structure 110 is dimensioned to encompass and engage the portions of housing structure 132 extending from sleeves 106, 108 to assist in enclosing and protecting the exposed portion of retainer structure 110. As in the previous embodiment, the plate retainer structure 100 is preferably formed of an engineering plastic or ceramic material. This facilitates the transfer of load from the load bearing plates directly to the carriage.

Figure 13:
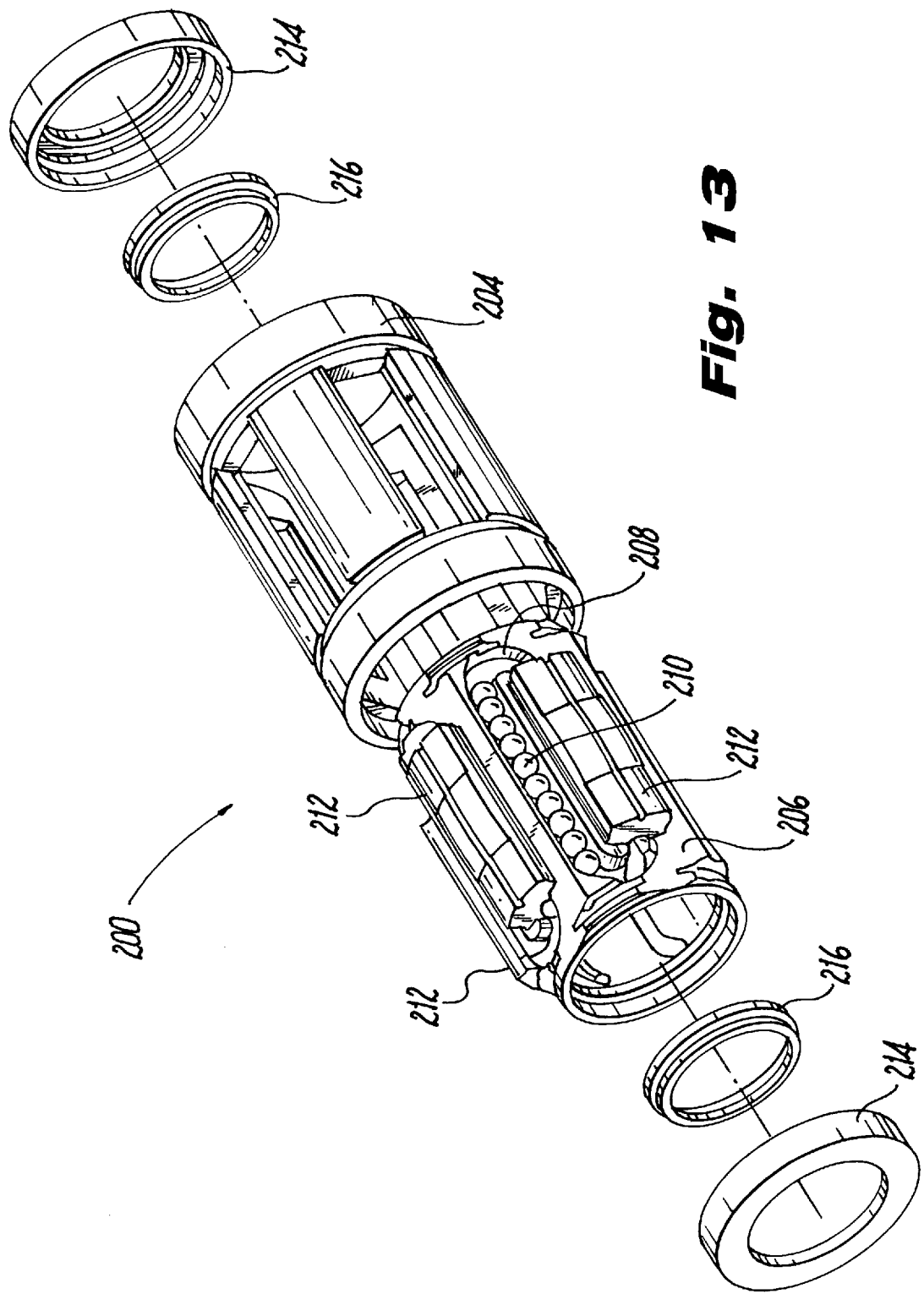
FIG. 13 is a perspective view with parts separated of a closed linear motion bearing assembly in accordance with another embodiment of the present invention.
Figure 14:
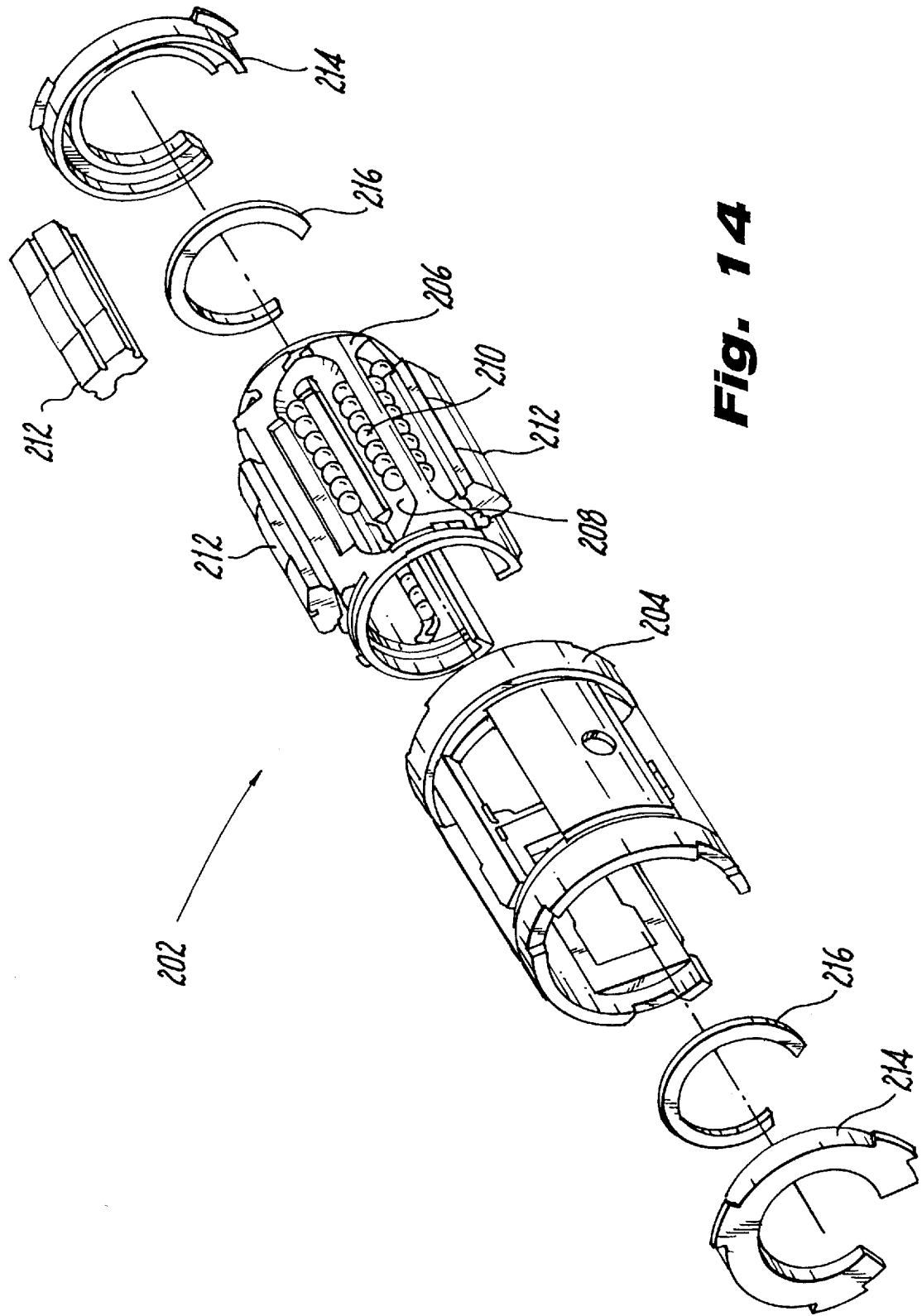
FIG. 14 is a perspective view with parts separated of an open-type linear motion bearing assembly similar to the embodiment illustrated in FIG. 13.

Referring now to FIGS. 13 and 14, both closed (FIG. 13) and open (FIG. 14) versions of linear motion bearings in accordance with the present invention are illustrated. These embodiments, 200 and 202 respectively, comprise an outer plate 204 and a retainer 206, both of which are formed of an engineering plastic and are configured for coaxial assembly. A plurality of tracks 208 are formed in the retainer 206 and house a multiplicity of bearing balls 210. These balls may be carbon steel, stainless steel, chrome, ceramic and/or engineering plastic depending upon, inter alia, the specific application of the linear motion bearing.

A plurality of load bearing plates 212 are juxtaposed adjacent load bearing portions of the tracks 208. Load bearing plates 212 are preferably formed of an engineering plastic and/or ceramic to inhibit noise, corrosion and/or magnetic influence.

End caps 214 are positioned on either longitudinal end of the linear motion bearings 200, 202. As is well known in the art, these end caps 214 serve to position and orient retainer 206 in outer plate 204. Optionally, one or more rail wipers 216 may be positioned adjacent the end caps 214.

Figure 15:
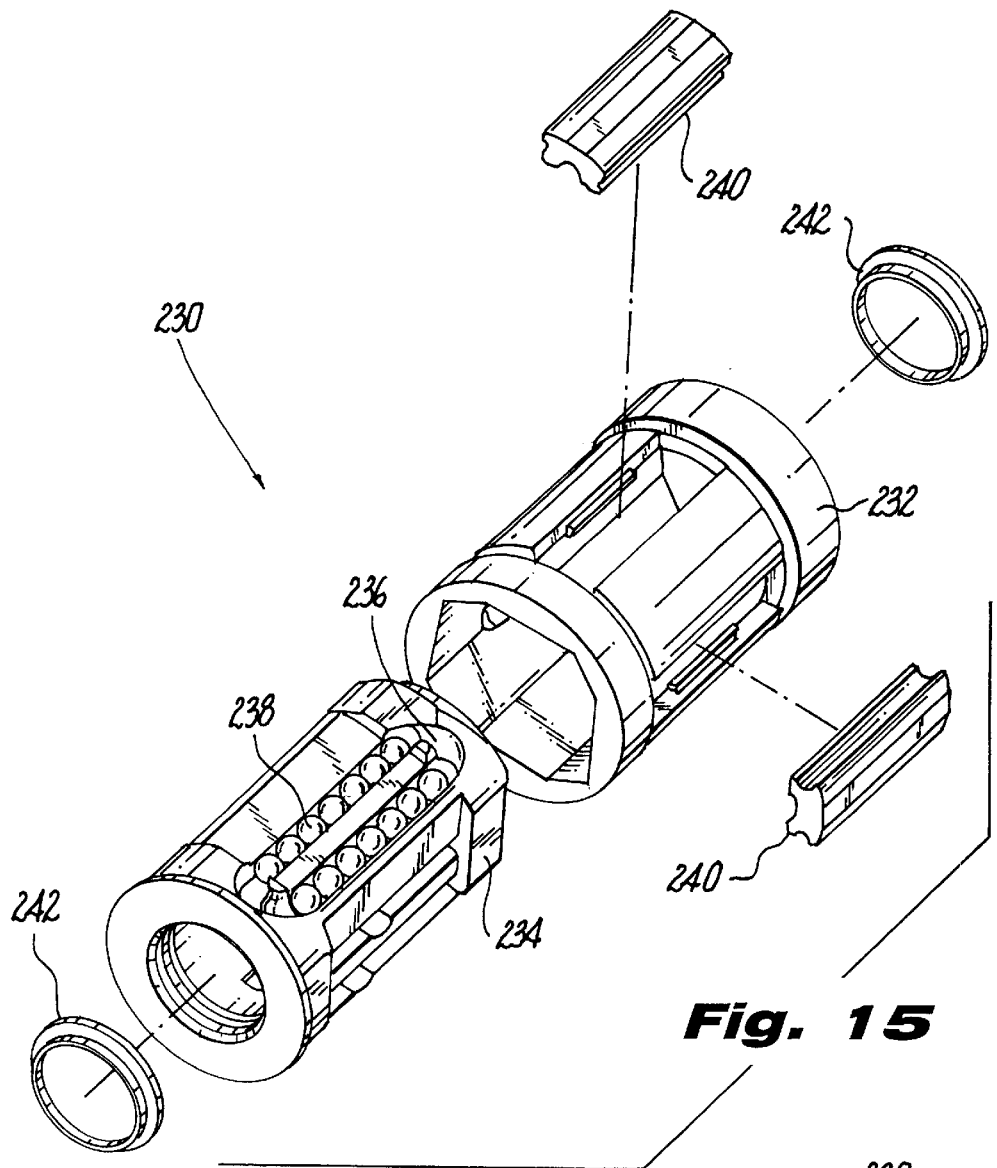
FIG. 15 is a perspective view with parts separated of a closed linear motion bearing in accordance with another embodiment of the present invention.
Figure 16:
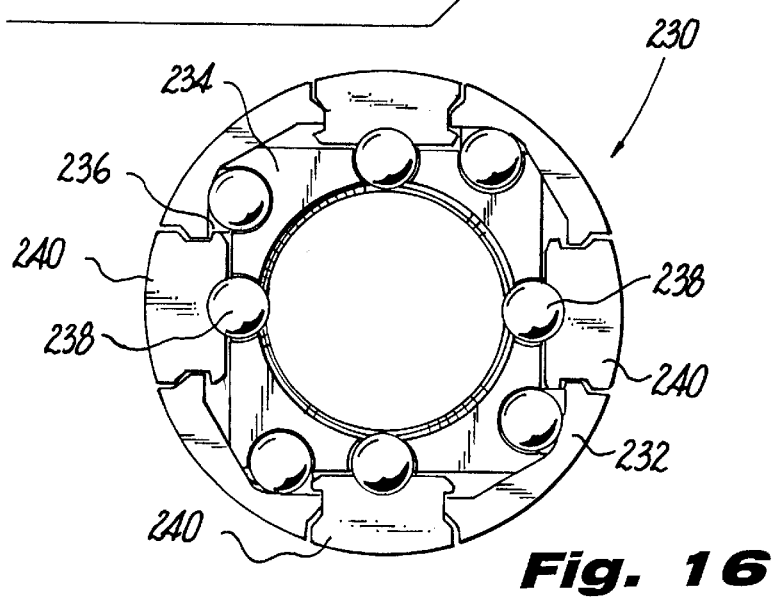
FIG. 16 is a transverse cross-sectional view of the closed linear motion bearing of FIG. 15.

Another embodiment of the present invention is illustrated in FIGS. 15 and 16. This embodiment is similar in design to the linear motion bearings shown in FIGS. 13–14 above. This linear motion bearing assembly, designated 230, includes a sleeve 232 configured to annularly enclose a retainer 234. As in previously described embodiments, preferably, both the retainer 234 and sleeve 232 are fabricated from ceramic and/or engineering plastics for reduced weight and ease of manufacture and assembly. A plurality of rolling element tracks 236 are at least partially formed in retainer 234 and guide a multiplicity of bearing balls 238 therein. In preferred embodiments, the balls 238 are fabricated from ceramics and/or engineering plastics to reduce noise, cost, corrosion damage and magnetic effects.

Load bearing plates 240 are disposed above load bearing portions of tracks 236 and serve to transmit loads from ball 238. These load bearing plates 240 are preferably formed from ceramics and/or engineering plastics compatible with the material of construction of the balls 238. As in previous embodiments, wipers 242 may be disposed on either longitudinal end of the linear motion bearing assembly 230.

Figure 17:
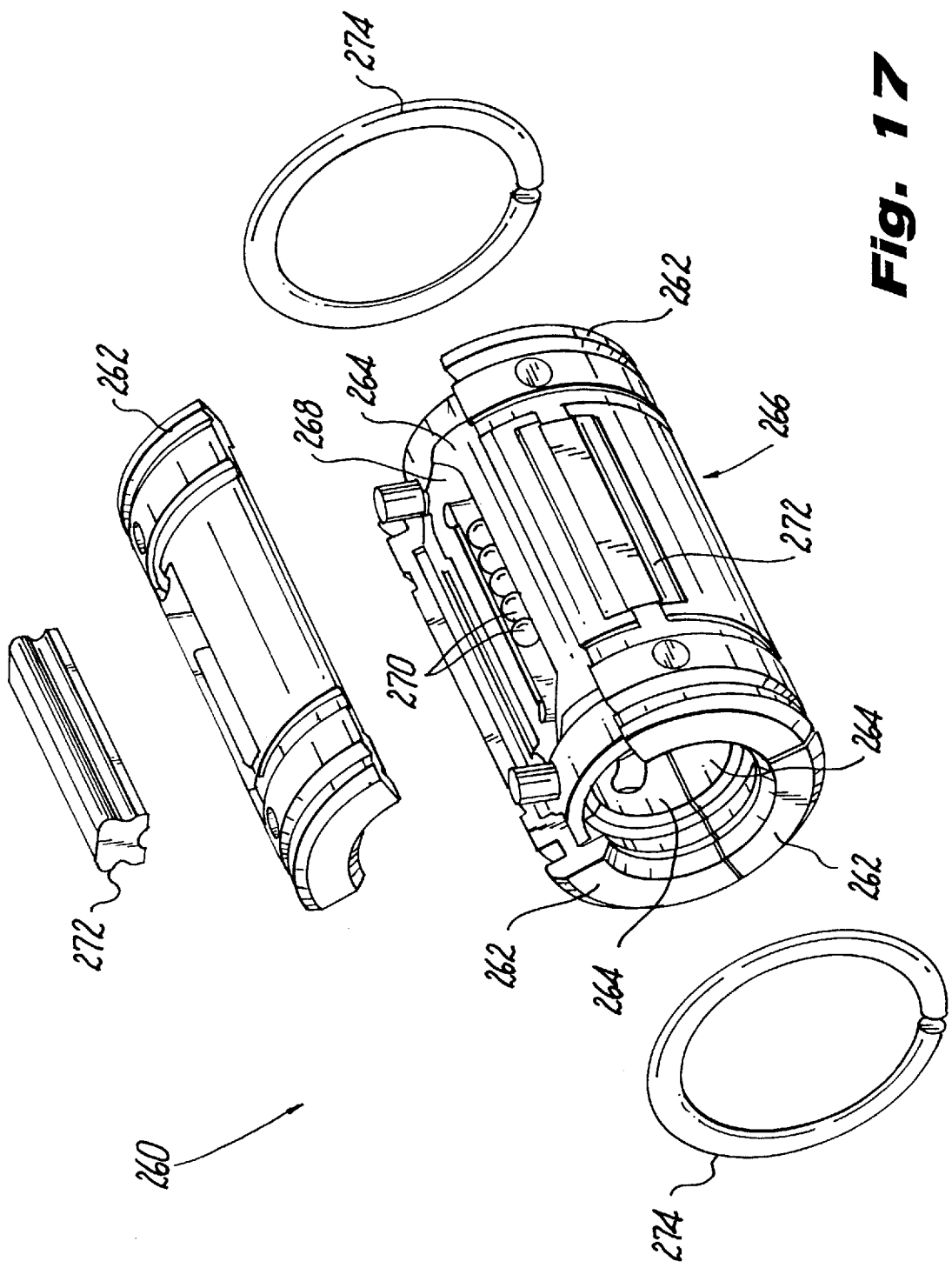
FIG. 17 is a perspective view with parts separated of a closed linear motion bearing in accordance with another embodiment of the present invention.

FIG. 17 illustrates another linear motion bearing assembly 260 incorporating the novel features of the present invention. This linear motion bearing assembly includes four retainer lids 262 which attach to a corresponding retainer 264 to form a bearing segment 266. Four of the bearing segments 262 form the bearing assembly 260 held together by retainer rings 274.

Lid 262 and retainer 264 define at least one track 268 therebetween. Track 268 guides a multiplicity of bearing balls 270 therein.

A load bearing plate 272 is disposed in retainer lid 262 in juxtaposition above load bearing portions of track 268. Preferably, one or more of the load bearing plates 272, retainer lid 262, retainer 264 and/or the balls 270 are fabricated from ceramics or engineering plastics to facilitate, inter alia, noise reduction, ease of fabrication or assembly, cost reduction, corrosion resistance or magnetic resistance.

Figure 18:
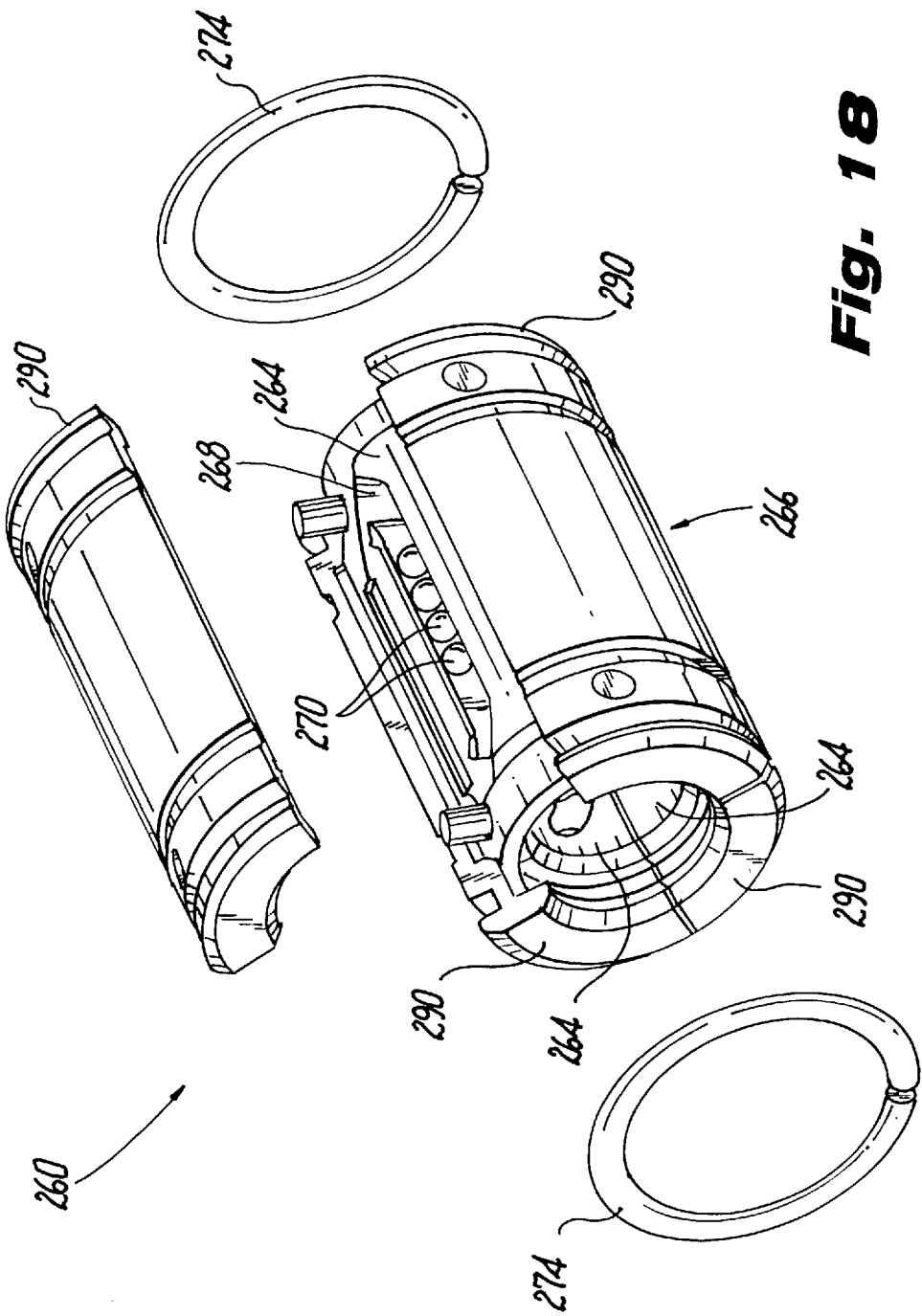
FIG. 18 is a perspective view with parts separated of a closed linear motion bearing incorporating monolithically formed load bearing plates and lids.

FIG. 18 illustrates a variant of the linear motion bearing assembly 260 of FIG. 17. This variant is substantially identical to the linear motion bearing assembly of FIG. 17 with the exception that retainer lid 290 monolithically incorporates load bearing plate structure therein. Thus, the load bearing plate structure is formed of the same material as the retainer lid 290.

To the extent not already indicated, it also will be understood by those of ordinary skill in the art that any one of the various specific embodiments herein described and illustrated may be further modified to incorporate features shown in the other specific embodiments.

The invention in its broader aspects therefore is not limited to the specific embodiments herein shown and described but departures may be made therefrom within the scope of the accompanying claims without departing from the principles of the invention and without sacrificing its chief advantages.

We claim:

1. A linear motion bearing assembly for movement along a shaft comprising:

non-metallic rolling element retainer structure having at least a portion of a plurality of open axial rolling element tracks formed therein, said tracks including a load bearing portion, a return portion and turnarounds interconnecting said load bearing and return portions;

a plurality of rolling elements disposed in said tracks;

a plurality of non-metallic load bearing plates axially positioned adjacent said retainer structure for receiving load from said rolling elements disposed in said load bearing portion of the tracks; and a plate retainer structure covering said rolling element retainer structure, said plate retainer structure being configured and dimensioned to maintain said plurality of load bearing plates in position.

2. A linear motion bearing assembly as in claim 1, wherein said plate retainer structure is monolithically formed with said load bearing plates.

3. A linear motion bearing assembly as in claim 1, wherein said load bearing plates and said retainer are separately formed.

4. A linear motion bearing assembly as in claim 1, wherein said load bearing plates are fabricated from an engineering material selected from the group consisting of ceramics and plastic.

5. A linear motion bearing assembly as in claim 1, wherein the load bearing plates are fabricated from an engineering material selected from the group consisting of polyamide-imide, polyketone, polyether-imide, poly ethyl ether ketone, nylon, acetal, polycarbonate, silicon carbide, and silicon nitride.

6. A linear motion bearing assembly as in claim 1, further comprising a pair of end seals positioned adjacent longitudinal ends of said plate retainer structure.

7. A linear motion bearing assembly as in claim 1, further comprising a shaft fabricated from an engineering material selected from the group consisting of ceramics and plastics.

8. A linear motion bearing assembly as in claim 1, wherein the load bearing plates further include rolling element conforming tracks formed therein.

9. A linear motion bearing assembly as in claim 1, wherein said rolling element is a bearing ball.

10. A linear motion bearing assembly for movement along a shaft comprising:

non-metallic rolling element retainer structure having at least a portion of a plurality of open axial rolling element tracks formed therein, said tracks including a load bearing portion, a return portion and turnarounds interconnecting said load bearing and return portions;

a plurality of non-metallic rolling elements disposed in said tracks;

a plurality of non-metallic self-aligning load bearing plates axially positioned adjacent said retainer structure for receiving load from said non-metallic rolling elements disposed in said load bearing portion of the tracks; and a non-metallic plate retainer structure adjacent said rolling element retainer structure, said plate retainer structure being configured and dimensioned to maintain said plurality of load bearing plates in position.

11. A linear motion bearing assembly as in claim 10, wherein said load bearing plates are fabricated from an engineering material selected from the group consisting of ceramics and plastic.

12. A linear motion bearing assembly as in claim 10, wherein the load bearing plates are fabricated from an engineering material selected from the group consisting of polyamide-imide, polyketone, polyether-imide, poly ethyl ether ketone, nylon, acetal, polycarbonate, silicon carbide, and silicon nitride.

13. A linear motion bearing assembly as in claim 10, further comprising a pair of end seals positioned adjacent longitudinal ends of said non-metallic plate retainer structure.

14. A linear motion bearing assembly as in claim 10, further comprising a shaft fabricated from an engineering material selected from the group consisting of ceramics and plastics.

15. A linear motion bearing assembly as in claim 10, wherein said rolling element is a bearing ball.

16. A linear motion bearing assembly for movement along a shaft comprising:

non-metallic rolling element retainer structure having at least a portion of a plurality of open axial rolling element tracks formed therein, said tracks including a load bearing portion, a return portion and turnarounds interconnecting said load bearing and return portions;

a plurality of rolling elements disposed in said tracks; and non-metallic load bearing plate structure adjacent the rolling element retainer structure, the non-metallic load bearing plate structure being monolithically formed to receive load from the rolling elements.

17. A linear motion bearing assembly as in claim 16, further comprising a pair of end seals positioned adjacent longitudinal ends of said non-metallic load bearing plate structure.

18. A linear motion bearing assembly as in claim 16, further comprising a shaft fabricated from an engineering material selected from the group consisting of ceramics and plastics.

19. A linear motion bearing assembly as in claim 16, wherein said rolling element is a bearing ball.

20. A linear motion bearing assembly as in claim 19, wherein the bearing balls are formed of a non-metallic material.

* * * * *

UNITED STATES PATENT AND TRADEMARK OFFICE
CERTIFICATE OF CORRECTION

PATENT NO. : 5,829,882
DATED : November 3, 1998
INVENTOR(S) : Ng et al

It is certified that error appears in the above-identified patent and that said Letters Patent is hereby corrected as shown below:

On the title page: Item [73] Assignee: should read

-- Thomson Industries, Inc.--.

Signed and Sealed this

Twenty-fourth Day of October, 2000

Attest:

Q. TODD DICKINSON

*Attesting Officer*     *Director of Patents and Trademarks*